Oct. 1, 1968 D. A. MEYER 3,404,290
PEAK-TO-PEAK INTERMEDIATE FREQUENCY SINGLE CONTROL LIMITER
Filed May 25, 1965
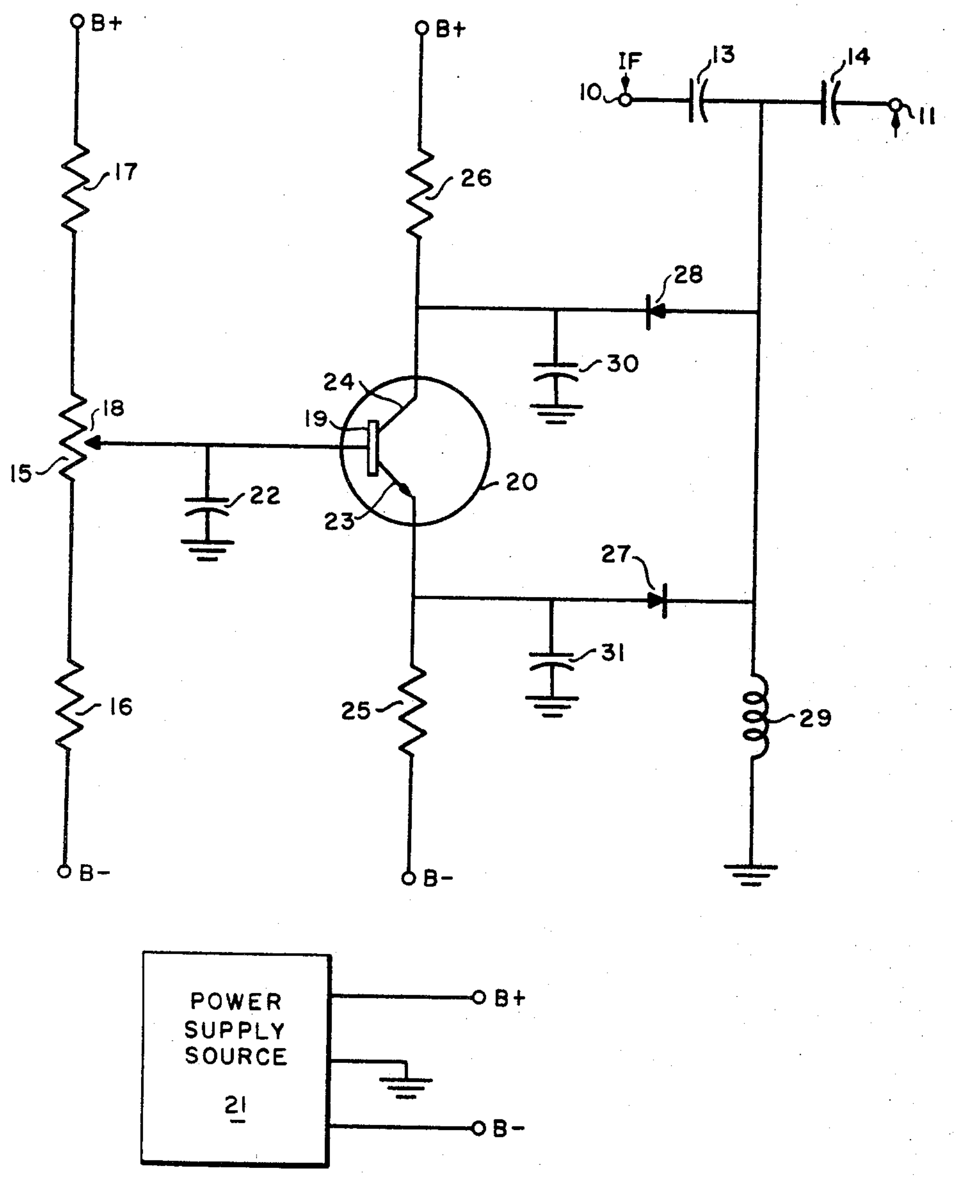
INVENTOR
DAVID A. MEYER
BY Ernest J Weinberger
John M. Pease
ATTYS.

United States Patent Office 3,404,290

Patented Oct. 1, 1968

3,404,290

PEAK-TO-PEAK INTERMEDIATE FREQUENCY SINGLE CONTROL LIMITER

David A. Meyer, Seaford, N.Y., assignor, by mesne assignments, to the United States of America as represented by the Secretary of the Navy Filed May 25, 1965, Ser. No. 458,798
3 Claims. (Cl. 307—237)

ABSTRACT OF THE DISCLOSURE

A peak-to-peak I.F. amplitude limiter circuit which includes a transistor having a pair of back-biased diodes, one of which is in the emitter circuit and the other in the collector circuit. A potential divider in the base electrode circuit selectively varies the potential at the base and in turn at the diodes. Thus, by varying the divider the limiting or clipping I.F. level is adjusted.

This invention relates in general to the limiting or clipping of signals and more particularly to the symmetrical peak-to-peak limiting of intermediate frequencies through the use of a single limit level control which is independent of the I.F. gain setting.

Various equipments and types of operation require the peak-to-peak amplitude limiting of intermediate frequency signals. Such equipment might include radar, and automatic control circuitry where it is desirable to alter the I.F. limits without any further adjustment of the I.F. gain. Presently, limit level settings are accomplished by changing the gain of a tube or transistor and the process of changing the I.F. gain setting requires a later change (as in radar) in the video gain, thus necessitating two controls and two adjustments. Thus not only is it necessary to perform two operations but additional circuits are required.

In view of the foregoing it is an object of this invention to provide a relatively simple, reliable and inexpensive I.F. amplitude limiter which requires only a single control adjustment.

Another object is to provide a peak-to-peak I.F. limiter wherein the positive and negative voltage excursions thereof are symmetrically controlled by a single adjustment.

Other objects and advantages will appear from the following description of an example of the invention, and the novel features will be particularly pointed out in the appended claims.

The single accompanying drawing is a schematic diagram of an embodiment made in accordance with the principles of this invention.

Referring now to the single figure, the limiter or clipper circuit has an input terminal 10 and an output terminal 11 across which are connected the input capacitors 13 and 14. These capacitors are of a value such that the I.F. signal will pass therethrough almost unimpeded. The terminals 10 and 11 may be interchanged since this circuit is symmetrical. A voltage divider 15 which comprises resistors 16, 17 and potentiometer 18 supplies the variable D.C. level to base 19 of transistor 20. Power supply 21 provides the B+ and B— voltages across the divider network 15 while filter capacitor 22 serves to filter out any variation or ripple in the power supply voltage.

Voltage at emitter 23 and collector 24 are also provided from the supply 21 through their respective and equal resistors 25 and 26. As a general rule the emitter and collector currents of a transistors are approximately equal and become or approach equality with increasing transistor gain. The potentials at the emitter 23 and the collector 24 are coupled to back-bias diodes 27 and 28 respectively. The cathode of diode 27 and the anode of diode 28 are connected to the junction between capacitors 13 and 14 while this junction is tied to ground the inductance 29 which offers a high impedance at I.F. Shunting capacitors 30 and 31 connect the emitter and collector sides of the diodes to ground and are of a value so as to readily pass the I.F. signal.

Summarizing the overall operation it is clear that the most satisfactory condition is attained with the highest transistor gain. Equal potentials of opposite polarity are applied to the emitter and collector resistor so that the emitter is at some negative voltage and the collector at the same positive voltage. These electrode potentials are applied to the diodes to back-bias them by this voltage magnitude. The inductor coil 29 serves as a D.C. ground for the diode biasing while offering a high A.C. impedance at the intermediate frequencies. The input capacitors provide the A.C. coupling from other circuitry into and out of the limiter and insure that the diodes operate around a D.C. ground.

The potential divider network 15 provides a variable D.C. level to the base electrode of the transistor. Clearly by varying this base bias the emitter and collector potentials change which in turn alters the back-biasing level at the diodes. This variation provides the adjustment or selection of the limiting or clipping level of the I.F. signal. Since the base-to-emitter voltage drop is nominally small, the emitter voltage will always be slightly different. It will, however, track or follow any change in the base voltage. Capacitors 30 and 31 furnish an A.C. short circuit for the I.F. signals passing through the diodes.

Normal or proper level I.F. signals pass through the input capacitors without attenuation since the diodes are sufficiently back-biased. When, however, the I.F. signal level increases to the magnitude where its peak-to-peak voltage amplitude exceeds twice the voltage at either the emitter or collector or exceeds the absolute sum, these diodes conduct and with capactors 30 and 31 provide an extremely low impedance path to ground for the I.F. signal. Thus the I.F. signal limit level is that point (I.F. potential) at which the diodes are made to conduct. This limiter device of the invention employs a transistor as a control element to provide equal, controllable back-bias voltages to the diodes which sets the I.F. signal voltage limit and no change in I.F. gain is required to achieve a different limit level setting.

It will be understood that various changes in the details, materials, and arrangements of parts (and steps), which have been herein described and illustrated in order to explain the nature of the invention, may be made by those skilled in the art within the principle and scope of the invention as expressed in the appended claims.

I claim:

1. A circuit for symmetrically limiting both the positive-going and negative-going excursions of an intermediate frequency signal which comprises,
   - a source of B+ and B— potentials,
   - a transistor having a base, emitter and collector electrode,
   - a potential divider connected across said source and having its intermediate point connected to said base electrode,
   - a first and second resistor,
   - a series path having included therein said B+, said first resistor, said collector, said emitter, said second resistor and said B— potential,
   - a pair of series connected input capacitors having low impedance at the I.F. frequency,
   - a pair of oppositely polarized unidirectional conducting means, each of said means back-bias connected at the junction of said input capacitors, and one of said means to said emitter and the other to said collector, a pair of shunt capacitors, one connected between said emitter and ground and the other connected between said collector and ground, whereby when said I.F. signal is applied to one of said input capacitors its voltage at the output of the other input capacitor excursion will be symmetrically limited.

2. The circuit according to claim 1 further including a high I.F. impedance network connected between said junction and ground.

3. The circuit according to claim 2 further including a filter capacitor connected between said base electrode and ground.

References Cited

UNITED STATES PATENTS

| | | | |
|---|---|---|---|
| 2,290,959 | 7/1942 | Hagen | 307—88.5 |
| 2,863,123 | 12/1958 | Koch | 307—88.5 |
| 3,085,131 | 4/1963 | Diehl | 307—88.5 |
| 3,188,554 | 6/1965 | Reid | 307—88.5 |
| 3,311,837 | 3/1967 | Moreines | 307—88.5 |

ARTHUR GAUSS, *Primary Examiner.*

H. DIXON, *Assistant Examiner.*